United States Patent
Ueda et al.

(10) Patent No.: US 6,403,128 B2
(45) Date of Patent: Jun. 11, 2002

(54) BAKERY PRODUCTS CONTAINING FRUCTO-OLIGOSACCHARIDE

(75) Inventors: Kohji Ueda; Takehiro Sakaki; Masaki Maruyama, all of Aichi (JP)

(73) Assignee: Como Co., Ltd., Aichi (JP)

( * ) Notice: Subject to any disclaimer, the term of this patent is extended or adjusted under 35 U.S.C. 154(b) by 0 days.

(21) Appl. No.: 09/802,851

(22) Filed: Mar. 12, 2001

(30) Foreign Application Priority Data

Mar. 10, 2000 (JP) ........................................ 2000-067259

(51) Int. Cl.⁷ ............................ A21D 2/36; A21D 13/00
(52) U.S. Cl. ............................ 426/18; 426/62; 426/549
(58) Field of Search ............................ 426/18, 52, 61, 426/62, 71, 549, 658, 653

(56) References Cited

U.S. PATENT DOCUMENTS 3,963,835 A * 6/1976 Gryczka ........................ 426/18
4,950,489 A * 8/1990 Spiller ........................ 426/18

FOREIGN PATENT DOCUMENTS

JP 63-146742 * 6/1988

\* cited by examiner

*Primary Examiner*—Keith Hendricks
(74) *Attorney, Agent, or Firm*—Wenderoth, Lind & Ponack, L.L.P.

(57) ABSTRACT

Bakery products such as bread obtained by adding the functions of fructo-oligosaccharide so as not to impair tastes and eating feeling. By eating such bakery products, the functions of fructo-oligosaccharide reveal. A bakery product such as croissant and panettone containing fructo-oligosaccharide is obtained by fermenting a mixture of fructo-oligosaccharide and flour as a major ingredient with a madre containing *Saccharomyces exiguus, Lactobacillus sanfrancisco* and *Lactobacillus comoensis,* and baking the dough thus obtained.

3 Claims, 3 Drawing Sheets

1. glycerol (Gly)   2. fructose (Frc)   3. glucose (Glc)
4. sucrose (Suc)    5. lactose (Lac)    6. lactosucrose (Ls)
7. maltopentaose (G5)

average value ± standard error
[number of bacillus (n=8), occupation percentage (n=5)]

* : $p < 0.05$

BAKERY PRODUCTS CONTAINING FRUCTO-OLIGOSACCHARIDE

BACKGROUND OF THE INVENTION

This invention relates to bakery products containing fructo-oligosaccharide, a method for manufacturing the same and dough for such bakery products.

Generally, for bread, flour and water are used as main materials. Dough is prepared by mixing bakers' yeast with flour and water and fermenting the mixture. Bread is made by baking the dough. In classification, bakers' yeast belongs to *Saccharomyces crevisiae*.

Since the approval system for specific health foods started, various food materials and foods have been studied to give them healthy function.

For example, in order to improve a daily life habit such as habitual constipation, as functional food having excretion-improving functions, use of less digestive oligosaccharides is effective. As one of them, fructo-oligosaccharide is known.

Fructo-oligosaccharide is galactosylsucrose [4G-β-D-galactosylsucrose, O-β-D-galactopyanosyl-(1→4)-O-α-D-glucopyanosyl-(1←2)-β-D-fructofuranoside], which is obtained by reacting β-fructofuranosidase with lactose and sucrose.

Such fructo-oligosaccharide is also called lactoscrose (LS). It reaches the colon at the bottom of the digestive tract without being scarcely hydrolyzed by human digestive enzymes, and increases *Bacillus bifidus* in the intestines.

If the microflora in the human intestines is improved by taking fructo-oligosaccharide, organic acids in solid wastes increase, and decomposed products such as ammonia and sulfates decrease.

But if fructo-oligosaccharide is blended into dough in the same manner as sweeteners ordinarily used for bread, which is a principal food of humans, ferment bacilli will assimilate it during the dough fermenting step, so that fructo-oligosaccharide would not remain in the fermented dough by a sufficient amount.

Saccharides blended into bread dough are subjected to decomposition action by invertase in bakers' yeast, and assimilated as an energy source of the yeast bacilli. Thus, it was difficult to give bread the functions of fructo-oligosaccharide by blending it into bread.

For such material as bread dough in which an eating sensation that is porous but viscous is obtained by finely adjusting the degree of proliferation of ferment bacilli, it is impossible to uniformly mix sweeteners or other additives in dough that has been fermented, without impairing the eating sensation. This is because if additives are mixed unevenly in bread dough, the adjusted dough structure might be damaged.

An object of this invention is to add fructo-oligosaccharide to bakery products such as bread so as not to impair tastes and eating sensations so that the health-improving functions of fructo-oligosaccharide will be sufficiently revealed.

SUMMARY OF THE INVENTION

According to this invention, there is provided a bakery product containing fructo-oligosaccharide wherein a mixture of fructo-oligosaccharide and flour as a major ingredient is fermented with a madre containing *Saccharomyces exiguous, Lactobacillus sanfrancisco* and *Lactobacillus comoensis*, and the dough thus obtained is baked.

For such a bakery product, the invertase activity is moderate while the madre containing *Saccharomyces exiguous, Lactobacillus sanfrancisco* and *Lactobacillus comoensis* performs the fermenting action, so that during the dough manufacturing step, it will not positively assimilate fructo-oligosaccharide.

The inventors conducted the following studies about the assimilation of fructo-oligosaccharide in microbial consortia containing this new kind of bacillus.

Since if *lactobacilli* alone is used, neither *Lactobacillus comoensis* nor *Lactobacillus sanfrancisco* assimilate lactose or sucrose, it is considered that neither decomposition nor assimilation of fructo-oligosaccharide will occur. Also, as for yeast, it is considered that Saccharomyces exiguus is slow in the consumption of sugar compared with saccharomyces cerevisiae, which is an ordinary bakers' yeast, and thus slow to decompose fructo-oligosaccharide. Further, the primary reason is considered to be that because during mix-cultivation of yeast and *lactobacilli*, the activity of the yeast is suppressed by the acid of *lactobacilli*, if there exists sugar, which preferentially assimilate, does not assimilate so much fructo-oligosaccharide which is low in the priority order of assimilation.

With the bakery product using the above madre, it is possible to make the fructo-oligosaccharide added during mixing of materials remain (by e.g. 50% or over). Thus, the bakery product improves daily life habits such as habitual constipation by promoting proliferation of *Bacillus bifidus* in the intestines of a person who eats it, and promoting excretion.

As bakery products in which fructo-oligosaccharide remains, croissant, panettone (also called Italian cake), and cookies can be cited as representative examples.

Also, in order to solve the same problems as above, according to the present invention, there is also provided a method of manufacturing a bakery product containing fructo-oligosaccharide, comprising the steps of mixing flour, water and madre containing *Saccharomyces exiguus, Lactobacillus sanfrancisco* and *Lactobacillus comoensis*, preparing dough by fermenting the mixture, and baking this dough.

In the method of manufacturing the bakery product of this invention, a large part of the fructo-oligosaccharide added during the manufacturing steps remains in the dough. Thus, by baking the dough, it is possible to manufacture a bakery product having the functions of fructo-oligosaccharide.

Also, in order to solve the problems described above, according to this invention, there is provided a dough for bakery products containing fructo-oligosaccharide wherein a mixture of fructo-oligosaccharide and flour as a major ingredient is fermented with a madre containing *Saccharomyces exiguus, Lactobacillus sanfrancisco* and *Lactobacillus comoensis*.

With such a dough for bakery products of this invention, because the invertase activity is moderate while the madre carries out the fermenting action, most part of the added fructo-oligosaccharide remains. Thus, the dough using the above madre reveals the health-improving functions of the fructo-oligosaccharide.

Other features and objects of the present invention will become apparent from the following description made with reference to the accompanying drawings, in which:

DETAILED DESCRIPTION OF THE PREFERRED EMBODIMENT

Figure 1A:
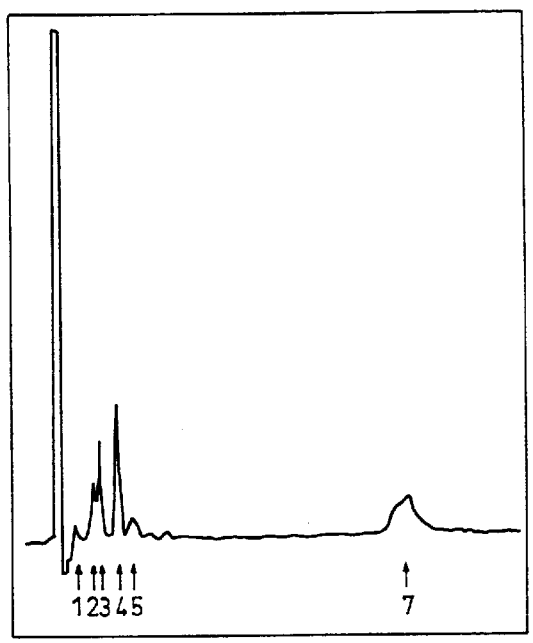
FIG. 1A is a chromatogram of Comparative Example 1.

According to the present application, fructo-oligosaccharide is added to flour as a main ingredient and a predetermined madre is added to the mixture to ferment it, and the dough obtained is baked to obtain bakery products.

The fructo-oligosaccharide used in this invention is, as described above, galactosylsucrose[4G-β-D-galactosylsucrose, O-β-D-galactopyranosyl-(1→4)-O-α-Dglucopyranosyl-(1←2)-β-D-fructofuranoside], which is obtained by reacting β-fructofuranosidase with lactose and sucrose. As fructo-oligosaccharide, a commercially available one may be used. For example, LS-55P, LS-55L made by Ensuiko Sugar Refining Co.,LTD. (ones containing fructo-oligosaccharide by 55% or over in the solid portion) may be used.

The mixture used in this invention is a mixture of raw materials ordinarily used to prepare a dough for bakery products. In many cases, besides flour, water, saccharide (sugar, glucose, liquid sugar, etc.), salt, fat, egg, etc. are mixed. Further, a supplement such as vitamins may be added as needed.

Among the predetermined madre, *Saccharomyces exiguus, Lactobacillus sanfrancisco* and *Lactobacillus comoensis* are ferment bacilli contained in madre for a well-known Italian cake called "panettone". They are contained in ferment bacilli for bread eaten in the region around Lake Como located at the foot of the European Alps.

Any of these three kinds of ferment bacilli are available as a madre for "panettone". A method of manufacturing a madre for Italian cakes using such ferment bacilli is disclosed in Japanese patent publication No. 2-18811.

As described in this publication, for *Lactobacillus comoensis,* one deposited at National Institute of Bioscience and Human-Technology as Recept No. 9022 may be used. *Saccharomyces exiguus* and *Lactobacillus sanfrancisco* are available from R. TETTAMANTI&FIGLI R.T.F.S.p.A., which is an Italian company.

Mixing of materials which are flour and a madre containing such predetermined ferment bacilli, preparation of dough by fermenting the mixture, and baking can be carried out in exactly the same manner as when manufacturing ordinary bread such as panettone and croissant.

For example, in order to manufacture panettone by sponge dough method, after *Saccharomyces exiguus, Lactobacillus sanfrancisco* and *Lactobacillus comoensis* have been inoculated into a culture ground which contains flour and water as essential components and mixed, to part of the cultured product obtained by culturing, flour and water are added, mixed and fermented. The steps of adding flour and water as essential ingredients to part of the fermented product, and mixing and kneading are repeated 5 to 10 times to obtain a madre.

To the madre, flour and water are added as essential ingredients, mixed, kneaded and fermented. To the entire mixture, flour and water are added as essential ingredients, mixed, kneaded and fermented to obtain a proliferated madre by proliferation of a madre.

Further, to the proliferated madre, flour, fat, saccharides and water are mixed, kneaded and fermented to obtain sponge dough.

After carrying out the main kneading in which flour, fat, saccharides, salt and water are mixed to the sponge dough, the mixture is divided, let to stand or refrigerated. Thereafter it is formed into desired shapes and then baked to obtain panettone. The step of obtaining a madre, the step of obtaining proliferated madre, the step of obtaining the sponge dough, main mixing, dividing and moulding steps and the baking step will be described below in more detail.

First, in the step of obtaining a madre, in a culture ground in which 40–42 parts by weight of water is added to 100 parts by weight of flour which contains 13.5 to 14.5 wt % of water, 0.4–0.45% of ash content and 11–11.5% of protein, about $10^7$/g of Saccharomyces exiguus, about $10^8$/g of Lactobacillus sanfrancisco and about $10^6$/g of Lactobacillus comoensis are inoculated and mixed, and then the mixture is cultured for 20–24 hours while maintaining the temperature at 16–18° C. When the pH reaches to 3.9–4.0, culturing is stopped and 100 parts by weight of the cultured product obtained is mixed with 100–200 parts by weight of flour and 40–80 parts by weight of water, and the mixture is kneaded for about 5–15 minutes while controlling the kneading temperature at 23–25° C. Thereafter, in a fermentation room, it is fermented for 20–24 hours at 16–18° C. so that the pH will reach 3.9 to 4.0. These operations are repeated 5–10 times to obtain madre.

Next, in the step of obtaining a proliferated madre, 100 parts of madre obtained in the above step, 100–200 wt % of flour and 40–80 wt % water are kneaded for 5 to 15 minutes while controlling the kneading temperature at 24–25° C., and fermented for 3–4 hours in the fermentation room to adjust the pH of the dough to 4.1 to 4.2. Thereafter, 100–200 parts by weight of flour and 40–80 parts by weight of water are added and kneaded for 5–15 minutes while maintaining the kneading temperature at 24–25° C. The mixture is then fermented for 3–4 hours to adjust the pH of the dough to 4.30 to 4.40 to obtain a proliferated madre by proliferation.

Next, in the step of obtaining sponge dough, 30–100 parts by weight of the proliferated madre, 100–200 parts by weight of flour, 20–40 parts by weight of fat, 20–40 parts by weight of saccharides, 20–40 parts by weight of eggs and 40–80 parts by weight of water are mixed, kneaded at a temperature of 20 to 25° C., and fermented for 3–6 hours at room temperature to obtain a sponge dough.

And in the main mixing, division and moulding steps, for example, for 100–200 parts by weight of fat, 50–100 parts by weight of saccharides, 2–12 parts by weight of salt, 20–50 parts by weight of water, 50–100 parts by weight of flour and 40–80 parts by weight of egg, the entire amount of sponge dough obtained in the above step is mixed in a mixer while adjusting the temperature at 20–30° C. After let to stand for 10–60 minutes, the mixture is refrigerated for 5–45 hours at 0–10° C. and moulded into desired shapes.

In the baking step, for example, after the dough that has been refrigerated is fermented for 5–10 hours in the fermentation room at 28–35° C., it is baked in an oven of 160–320° C. for 15–30 minutes.

EXAMPLES AND COMPARATIVE EXAMPLES

Example 1: Manufacturing example of panettone

Sponge dough of the blend rate shown in Table 1 was made and fermented for 8 hours at room temperature. The blend rate shown in Table 1 is in weight parts and the saccharide is fructo-oligosaccharide (made by Ensuiko Sugar Refining Co., LTD.: LS-55 containing fructo-oligosaccharide by 55% or over in the solid portion).

To the sponge dough for which fermentation ended, materials were mixed at the blend rates shown in Table 2 and the final dough was made in an ordinary way.

The final dough thus obtained was divided, let to stand for 60 minutes at 25° C., and moulded into desired shapes.

The moulded dough was fermented for 10 hours in a fermentation room of 28° C. and then baked for 30 minutes in an oven of 200° C. to obtain panettone.

Comparative Example 1: Manufacturing example of croissant

Using the madre obtained in the "steps of obtaining madre", according to a recipe used for commercial croissant, and using only sucrose and oligosaccharide as sweeteners, croissant was made (36 g per piece).

Example 2: Manufacturing example of croissant

Except that part of the sucrose as a sweetener was repleaced with fructo-oligosaccharide (made by Ensuiko Sugar Refining Co., LTD.: LS-55) so that 3 g of fructo-oligosaccharide would be contained per piece, croissant was manufactured in the same manner (36 g per piece) as in Comparative Example 1.

The croissant obtained was, like ordinary croissant, baked brown. As for its flavor, as a result of functional test by three professional panellist, it was confirmed that it was substantially the same in color, smell, swelling, mouth-melting and taste as ordinary croissant. It was confirmed that there was no sense of incompatibility in flavor.

For croissant of Example 2 and Comparative Example 1, in the following manner, a test or a questionnaire was conducted for a) measurement of content of the fructo-oligosaccharide, b) preservation state of croissant, c) measurement of the number of *Bacilli bifidus* in fecal matter after taking, and d) excretion-improving properties after taking. The test or questionnaire for items c) and d) was conducted at Fujita Health University and Fujita Memorial Institute of Pharmacognosy, Fujita Health University.

a) Measurement of content of the fructo-oligosaccharide

Three weeks after manufacture, each of two pieces of the croissant obtained in Example 2 was divided into two and one half was used as a test piece. To the test piece (18 g), 90 ml of water was added, and 10 ml of Maltopentaose (G5) was added (concentration adjusted to 1420 mg/ml) as an internal standard substance. The mixture was then homogenized for five minutes at 50000 rpm, and subjected to centrifugation for 20 minutes at 12000 rpm. A supernatant fluid was obtained. To 20 ml of the supernatant fluid, an equal amount of n-hexane was added for degreasing, a water layer was recovered by about 20 ml, and an equal amount of ethanol was added. After desalting, it was filtered and used as a specimen for high-pressure liquid chromatography (HPLC).

Figure 1B:
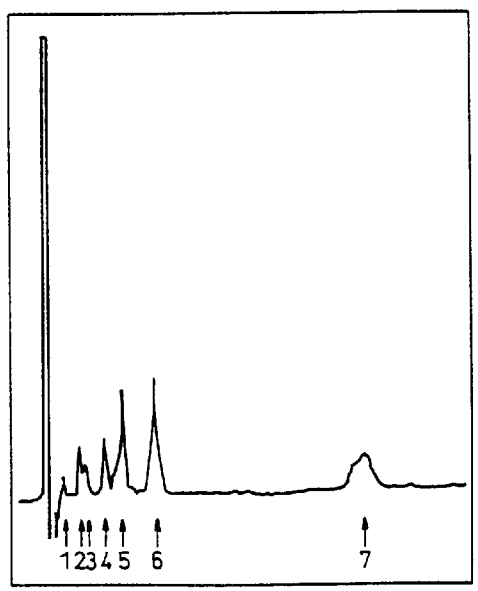
FIG. 1B is a chromatogram of Example 2.
Figure 2:
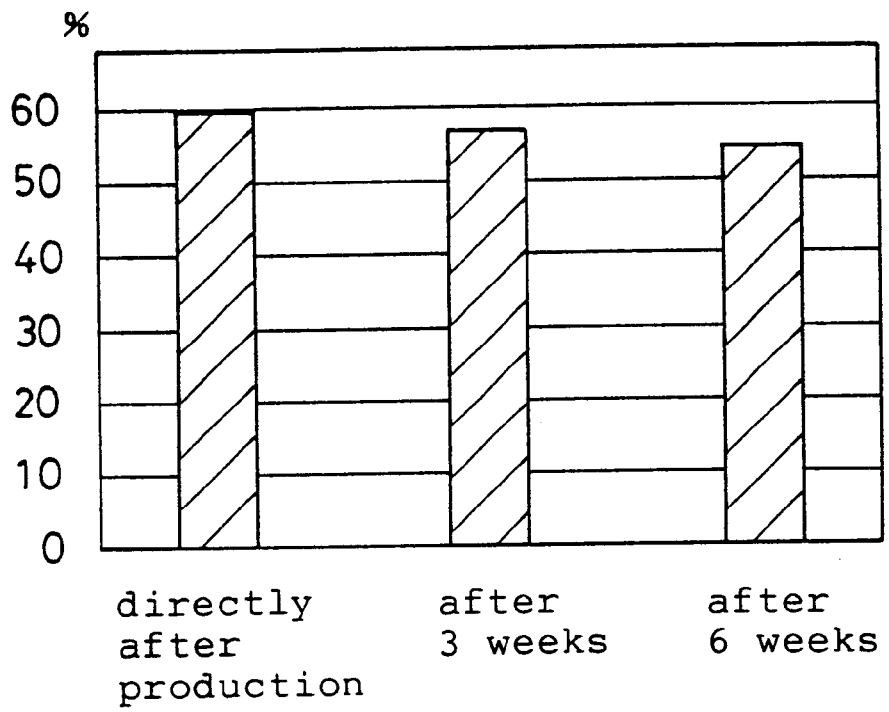
FIG. 2 is a graph showing the fructo-oligosaccharide retaining rate in Example 2.

For this specimen, HPLC was carried out under the following conditions. The chromatogram obtained is shown in FIG. 1 and the composition of nutritional component is shown in FIG. 2.

Column: TSK-GEL Amide-80 (4.6 mm×250 mm)
Moving phase: $CH_3CN:H_2O=71:29$
Flow rate: 1.0 ml/min.
Detector: RID-6 Δ (made by SHIMADZU SEISAKUSHO)

In Example 2 (LS-containing croissant), five minutes after the start of the separation test by HPLC, glycerol originating from the ferment bacilli was separated, and then fructose (Frc), glucose (Glc), sucrose (Suc) and lactose (Lac) appeared. 16 minutes later, separation of fructo-oligosaccharide was confirmed, and 42 minutes later, Maltopentaose (G5), which was added as an internal standard substance, was separated.

In Comparative Example 1 (LS-unadded croissant), as in Example 2, glycerol, fructose (Frc), glucose (Glc), sucrose (Suc), lactose (Lac) and Maltopentaose (G5) appeared. But about 16 minutes later, a peak corresponding to fructo-oligosaccharide was not detected. In Table 3, the saccharide compositions for Example 2 and Comparative Example 1 are shown.

The content of fructo-oligosaccharide in one piece (36 g) of Example 2 was examined based on the above measuring separation method. It was 1.76 g on the average and it was confirmed that 60% of the originally added amount (3 g) remained. Thus, it was confirmed that only about 40% of the fructo-oligosaccharide originally added to croissant self-decomposed or was assimilated by microorganisms during the manufacturing process.

b) Preservation state of croissant

Croissant containing fructo-oligosaccharide obtained in Example 2 was preserved at normal temperature. Immediately after manufacture, 3 weeks later and 6 weeks later, HPLC was carried out under the same conditions to examine the preservation rate of fructo-oligosaccharide. The results are shown in FIG. 2.

As will be apparent from the results of FIG. 2, for croissant containing fructo-oligosaccharide of Example 2, even 3 weeks after manufacture, it was contained by 1.68 g (n=2) and even 6 weeks after manufacture, it was contained by 1.60 g (n=2). In either case, the remaining rate was 50% or over of the originally added amount (3 g).

Thus, it was confirmed that fructo-oligosaccharide contained in croissant is preserved at room temperature without being decomposed. Even after a lapse of 30 days, which is the takable time limit for long-life croissant, it was confirmed that it remained by a sufficient amount.

c) Croissant containing fructo-oligosaccharide obtained in Example 2 was given to ten female students suffering from constipation at the rate of two pieces a day, and the number of *Bacilli bifidus* in human wastes was measured and the occupancy rate of *Bacilli bifidus* relative to the total number of germs was examined. The results are shown in FIG. 3.

As for the determination of significant differences of the examination results, the number of bacilli was analyzed by Wilcoxon signed-ranks test between the test periods, and the occupancy rate was analyzed by paired t-test between the test periods. Also, "Cont period" in FIG. 3 indicates the results of 8th day after start of taking, "Blank period" indicates 15th day after start of taking, "LS1w period" indicates 22th day after start of taking, and "LS2w period" indicates 29th day after start of taking.

Figure 3B:
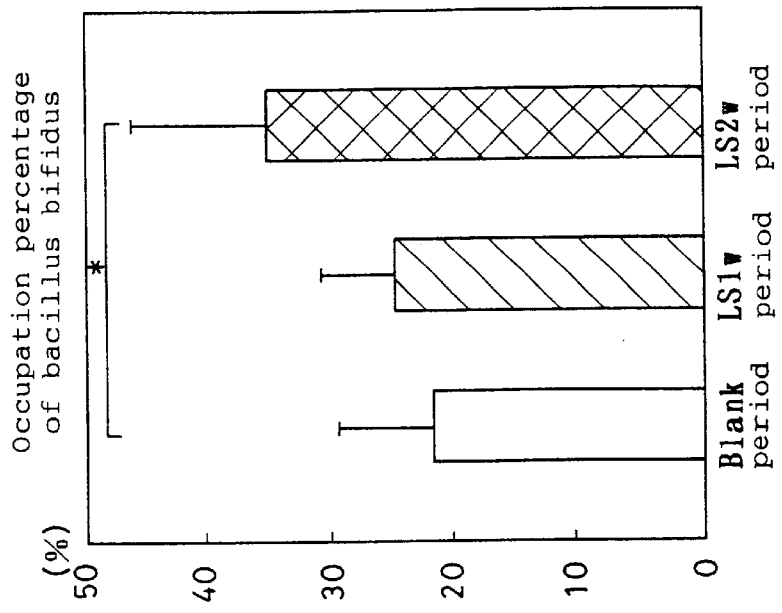
* and FIG. 3B is a graph showing the relation between the taking period of croissant containing fructo-oligosaccharide and the occupying rate of *Bacillus bifidus.*
Figure 3A:
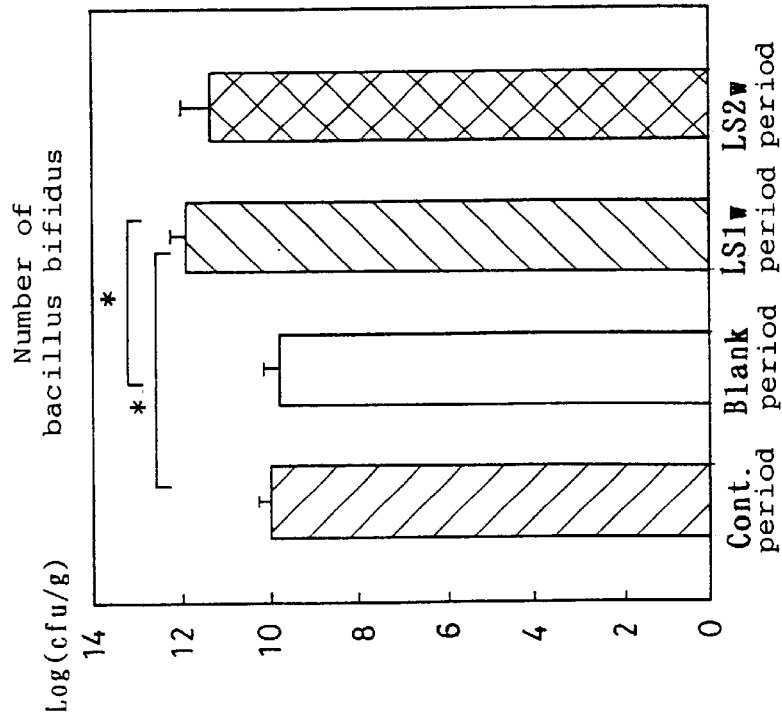
FIG. 3A is a graph showing the relation between the taking period of croissant containing fructo-oligosaccharide and the number of *Bacillus bifidus.

As will be apparent from the results of FIG. 3, it was confirmed that by taking croissant of Example 2, the number of *Bacilli bifidus* increased, and the occupancy rate of *Bacilli bifidus* increased from about 20% during the blank period to about 35%.

d) Excretion-improving properties after taking

For hospital personnel, participation to the questionnair was solicited. For 4 males and 39 females who were aged from 20 to 66 years old, the croissant of Example 2 was given by 2 pieces a day for one week. From the day when they began taking the croissant, questions were asked about the feeling of evacuation, the number of passages, refreshing feeling after evacuation. The results were as follows.

a) Feeling of evacuation 17 persons (39.5%) answered good, 2 persons (4.7%) had slightly bowels, 15 persons (34.9%) were slightly constipated, and 9 persons (20.9%) were constipated.

b) Number of passages

Per one week, 7 times or over: 3 persons (7.0%), 6–7 times: 14 persons (32.5%), 5–6 times: 6 persons (14.0%), 4–5 times: 0 person (0%), 3–4 times: 11 persons (25.6%), 2 times or less: 9 persons (20.9%).

c) Refreshing feeling after evacuation

Felt substantially refreshed: 28 persons (65.1%), not refreshed: 15 persons (34.9%)

According to the present invention, as described above, a mixture of flour as the major ingredient and fructo-oligosaccharide is fermented with a madre comprising pre-determined ferment bacilli and the dough obtained is baked. It is possible to make a sufficient amount of fructo-oligosaccharide sufficiently remain in croissant, panettone, other bread.

Since the function of fructo-oligosaccharide is imparted to such bakery products, by eating them, proliferation of Bacilli bifidus in the intestines is promoted, so that one can expect improvement in habitual constipation by mildly promoting excretion.

Also, according to the method of manufacturing bakery products of the present invention, since flour, warter and a madre comprising predetermined ferment bacilli are mixed, and the mixture is fermented to make a dough, and the dough is baked, it is possible to make a large part of fructo-oligosaccharide added to the dough remain. Thus by baking this dough, it is possible to manufacture bakery products having the functions of fructo-oligosaccharide. Also, according to the present invention, a mixture of flour and fructo-oligosaccharide is fermented with a madre comprising predetermined ferment bacilli to make a dough. Thus, by baking the dough, it is possible to reliably provide bakery products which can reveal the functions of fructo-oligosaccharide.

TABLE 1

| Panettone sour dough | 30 |
|---|---|
| flour | 100 |

TABLE 1-continued

| oil and fat | 25 |
|---|---|
| sugar (LS55) | 25 |
| egg | 25 |
| water | 45 |

TABLE 2

| | sponge dough | entire amount |
|---|---|---|
| flour | | 60 |
| oil and fat | | 100 |
| sugar (LS55) | | 60 |
| egg | | 40 |
| salt | | 2 |
| water | | 20 |

TABLE 3

| Sugar content (%) | Example 2 | Comp. Ex. 1 |
|---|---|---|
| glycerol | 2.7 | 2.8 |
| monosaccharide | 19.5 | 42.3 |
| cone sugar | 12.0 | 35.1 |
| lactose | 27.6 | 10.7 |
| flucto-oligosaccharide | 31.2 | 0 |
| others | 7.1 | 9.1 |

What is claimed is:

1. A bakery product containing fructo-oligosaccharide, obtained by adding fructo-oligosaccharide to flour, fermenting the mixture with a madre containing *Saccharomyces exiguus, Lactobacillus sanfrancisco* and *Lactobacillus comoensis* to prepare a dough, and baking a dough thus obtained.

2. A method of manufacturing bakery products containing fructo-oligosaccharide comprising the steps of mixing flour, water, fructo-oligosaccharide to prepare a mixture, and adding to the mixture a madre containing *Saccharomyces exiguus, Lactobacillus sanfrancisco* and *Lactobacillus comoensis* to ferment the mixture to make a dough, and baking the dough.

3. A dough for a bakery product containing fructo-oligosaccharide, said dough being obtained by mixing fructo-oligosaccharide to flour, and fermenting the mixture with a madre containing *Saccharomyces exiguus, Lactobacillus sanfrancisco* and *Lactobacillus comoensis*.

* * * * *